United States Patent [19]

Renheim

[11] Patent Number: 4,744,543
[45] Date of Patent: May 17, 1988

[54] ELECTRO-MAGNETICALLY ACTUATED VALVE ARRANGEMENT

[75] Inventor: Gunnar Renheim, Bromma, Sweden

[73] Assignee: Siemens Aktiengesellschaft, Berlin and Munich, Fed. Rep. of Germany

[21] Appl. No.: 896,732

[22] Filed: Aug. 15, 1986

[30] Foreign Application Priority Data

Aug. 26, 1985 [DE] Fed. Rep. of Germany ....... 3530453

[51] Int. Cl.$^4$ ............................................. F16K 31/08
[52] U.S. Cl. .................................. 251/65; 251/129.1; 251/129.21
[58] Field of Search .................... 251/65, 129.21, 129.1

[56] References Cited

U.S. PATENT DOCUMENTS

| | | | |
|---|---|---|---|
| 3,379,214 | 4/1968 | Weinberg | 251/65 X |
| 3,809,123 | 5/1974 | Heimann . | |
| 3,977,436 | 8/1976 | Larner | 251/65 X |
| 3,983,909 | 10/1976 | Anglade . | |
| 4,240,468 | 12/1980 | Brand et al. . | |
| 4,253,493 | 3/1981 | English et al. . | |
| 4,564,046 | 1/1986 | Lungu | 251/65 X |

FOREIGN PATENT DOCUMENTS

| | | | |
|---|---|---|---|
| 1232424 | 3/1967 | Fed. Rep. of Germany . | |
| 200882 | 11/1984 | Japan | 251/65 |
| 1417669 | 12/1975 | United Kingdom . | |

Primary Examiner—Arnold Rosenthal
Attorney, Agent, or Firm—Hill, Van Santen, Steadman & Simpson

[57] ABSTRACT

Electromagnetically actuated valve arrangement for flowing media comprising a sleeve in which an intake and a discharge valve each comprising a valve seat are applied. A permanent magnet arranged axially displaceable is provided between the valves, the flow of the medium from the intake to the discharge valve being controllable via this permanent magnet. In order for the valve arrangement to be simple and thus inexpensive in manufacture and to also reliably operate at high frequencies of the permanent magnet, it is proposed in accord with the invention that the permanent magnet comprises continuations in its outer region and at both sides, these continuations proceeding in the moving direction of the permanent magnet and extending beyond or over the valve seats.

8 Claims, 3 Drawing Sheets

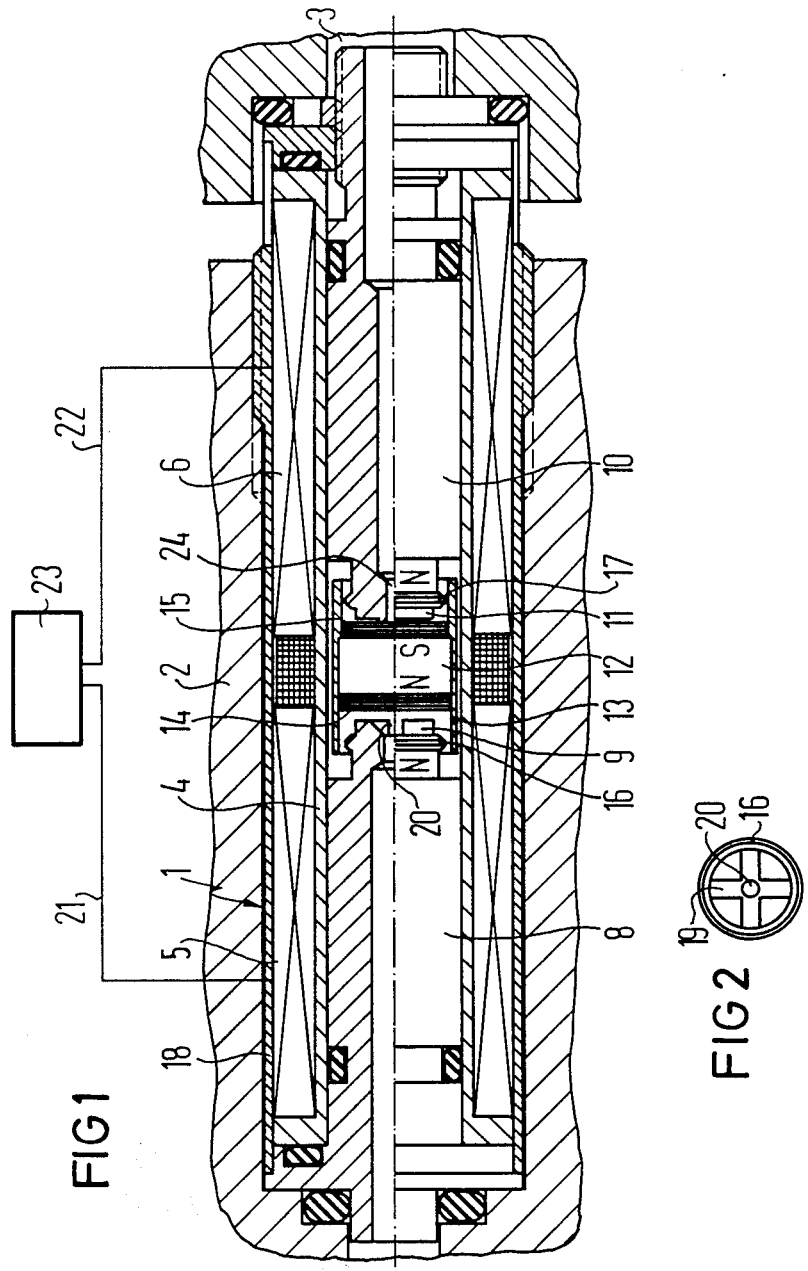

ELECTRO-MAGNETICALLY ACTUATED VALVE ARRANGEMENT

BACKGROUND OF THE INVENTION

1. Field of the Invention

The invention relates to an electro-magnetically actuated valve arrangement for flowing media comprising a sleeve in which an intake and a discharge valve each having a valve seat is applied, a permanent magnet arranged axially displaceable being provided therebetween, the flow of the medium from the intake to the discharge valve being controllable via said permanent magnet.

2. Description of the Prior Art

Given valve arrangements of this type, the permanent magnet works with a high frequency so that the valves can be closed or opened in the shortest possible time. When an air gap is provided between the permanent magnet and the sleeve for the passage of the medium, it can occur that the permanent magnet ends up in an oblique position and is thereby seized in the sleeve. German AS No. 1 232 424 discloses a valve arrangement of the type described above wherein the problem is resolved in that a radially magnetized cylindrical magnet is employed as permanent magnet and a sleeve of magnetizable metal is employed. The manufacture of such a permanent magnet is complicated and costly.

U.S. Pat. No. 4,240,468 discloses a further electro-magnetically actuated valve arrangement comprising a cylindrical armature of iron which controls the flow of a gas between two valves. The armature whose outside wall slides against the inside wall of a sleeve-like iron member comprises a plurality of longitudinal grooves and an axial bore for the passage of the gas in the circumferential surface thereof. For the discharge of the gas, either concentrically arranged flow bores or a concentrically proceeding annular gap which are not congruent with the longitudinal grooves or with the axial bore of the armature discharge into the discharge valve. Due to the multitude of grooves and bores in the armature or valve, the manufacture of this valve arrangement is relatively involved.

SUMMARY OF THE INVENTION

An object of the invention is to create a valve arrangement of the type described above which is simple in terms of manufacture and therefore inexpensive and which also operates reliably even at high frequencies of the permanent magnet.

This object is achieved in accord with the invention in that the permanent magnet includes continuations in its outer region and at both ends, these continuations proceeding in the moving direction of the permanent magnet and extending beyond or over the valve seats. As a consequence of the length of the continuation relative to the spacing between the valve seats, the permanent magnet cannot remain stuck in the sleeve.

A further simplification of assembly derives in that the coil member forms the sleeve. Few parts are thereby required in the construction of the valve arrangement.

An especially favorable embodiment is obtained in that radial spacings between valve seats and continuations as well as between the continuations and the sleeve are dimensioned such that the permanent magnet or the continuations thereof do not come into contact with the sleeve. This establishes an additional certainty that the permanent magnet will operate reliably.

In view of a favorable structural design, it is recommendable that the continuations be formed of a tube in which the permanent magnet is secured. A simplification of the structure of the continuations is thereby established.

It is proposed in an advantageous development of the invention that every valve seat contains elevations distributed over the circumference. Axial play is provided between these and the tube of the permanent magnet. The gas is conducted from the intake to the discharge valve between tube and elevations, whereby a relatively short constriction is obtained for the gas and, as a result thereof, a low resistance.

BRIEF DESCRIPTION OF THE DRAWINGS

The invention shall be set forth in greater detail below with reference to an exemplary embodiment shown in the drawings. Shown therein are:

FIG. 1 is a cross-sectional view through a valve arrangement of the invention.

FIG. 2 is a plan view of a valve seat of the valve arrangement of FIG. 1.

DESCRIPTION OF THE PREFERRED EMBODIMENTS

Figure 3:
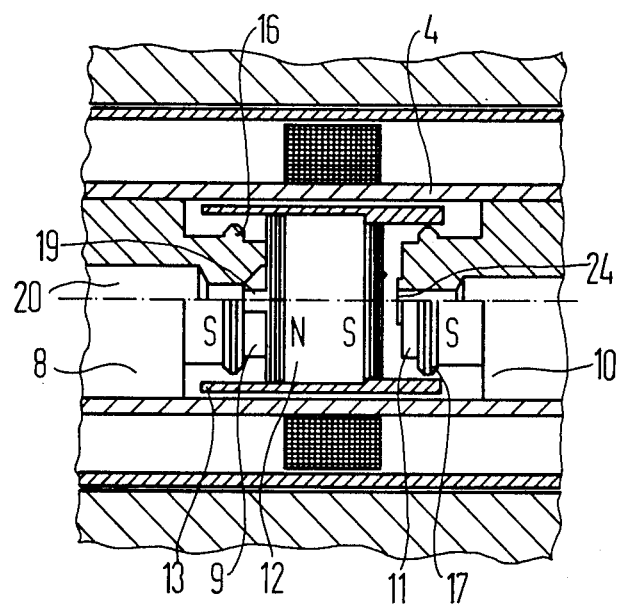
FIG. 3 is a further side view of the valve arrangement of the invention of FIG. 1.

FIG. 1 shows a valve arrangement 1 which is mounted in a housing 2. The housing 2 containing the valve arrangement 1 is connected, first, to a respiration apparatus (not shown) and, second to a gas feed conduit 3 to a patient (likewise not shown). The valve arrangement 1 includes a sleeve 4 which serves as a coil member for magnetic coils 5, 6 which are separated by a spacer element 25. An intake valve 8 having a valve seat 9 and a discharge valve 10 having a valve seat 11 are mounted in the coil member 4. In order to intensify the magnetic fields, the valves 8, 10 are manufactured of a magnetizable material.

A permanent magnet 12 arranged axially displaceable between the valve seats 9, 11 is provided, this permanent magnet 12 being secured in a tube 13 which extends beyond or over the valve seats 9, 11. Thus, the tube 13 forms a continuation of the permanent magnet 12 at both ends thereof. The two ends of the permanent magnet are provided with a plastic layer 14, 15 which serve as seals or, dampings for the valve seats 9, 11. On their outside wall, the valve seats 9, 11 have elevations in the form of annular beads 16, 17 whose diameter is smaller than that of the tube 13, so that a gap is present between the beads 16, 17 and the tube 13. Further, the radial spacings between the beads 16, 17 and the tube 13 as well as between the tube 13 and the coil member 4 are dimensioned such that the tube 13 with the permanent magnet 12 cannot come into contact with the inside wall of the coil member 4. The valve arrangement 1, finally, is provided with a cover sleeve 18. The valve arrangement 1 is connected via connecting lines 21, 22 to a known series circuit means 23 for regulating the feed of the magnetic coils 5, 6 which, since known, is shown as a block.

FIG. 2 shows that the end face of the valve seat 9 is provided with grooves 19 which proceed from a valve opening 20 of the intake valve 8 to the outside wall of the valve seat 9.

In this exemplary embodiment, that side of the permanent magnet 12 facing the valve seat 9 forms the northpole N and that side facing the valve seat 11 forms the southpole S. When, with a current surge from the series circuit 23, the magnetic coils 5, 6 excite the valves 8, 10 such that they obtain a northpole polarity, a force acts on the permanent magnet 12 moving the latter in the direction toward the valve seat 11. The plastic layer 15 is thereby applied in sealing fashion in front of an opening 24 of the valve seat 11 so that the gas supply to the patient is inhibited, as shown in FIG. 1.

When gas is to be supplied to the patient, the magnetic coils 5, 6 are excited such by a further current surge of the opposite polarity that an opposite polarity occurs. As a result thereof, the permanent magnet 12 is moved toward the valve seat 9 of the intake valve 8. This position of the permanent magnet 12 is shown in FIG. 3. The respiration gas now initially flows through the valve opening 20 and the grooves 19, between the bead 16 and the inside wall of the tube 13, between the inside wall of the coil member 4 and the outside wall of the tube 13. After that, the gas is conducted to the patient between the bead 17 and the inside wall of the tube 13 via the opening 24 and the gas supply conduit 3. As a consequence of the length of the tube 13 relative to the spacing of the valve seats 9, 11 and as a consequence of the radial spacings between the beads 16, 17 and the tube 13, a reliable opening and closing of the valve arrangement 1 is guaranteed even in long term operation without a risk of having the tube 13 or the permanent magnet 12 seize in the sleeve 4.

Figure 4:
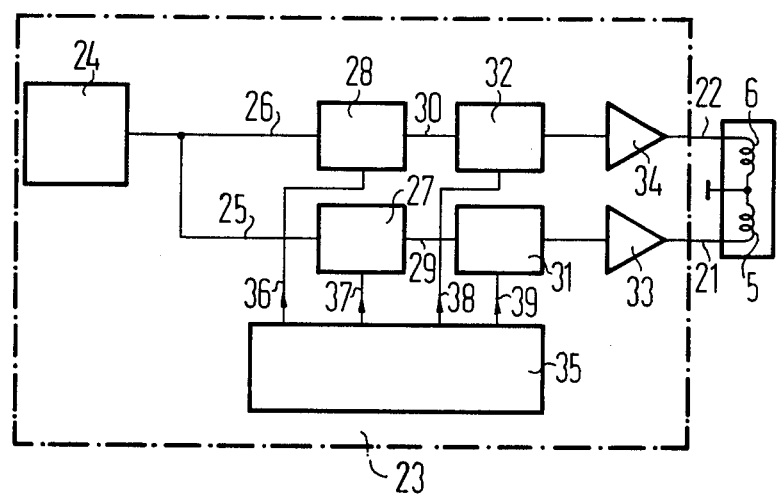
FIG. 4 is a block circuit diagram of a possible embodiment of a series circuit arrangement.

As illustrated in FIG. 4, the series means 23 comprises a pulse generator 24 which generates pulses having a fixed frequency. These are forwarded in parallel to one-shot multivibrators 27 or 28 via lines 25 or 26. The output signals of these multivibrators are supplied via lines 29 or 30 to amplifiers 31 or 32 whose output signals drive the magnetic coils 5 and 6 via output amplifiers 33, 34. The time duration of the metastable condition of the one-shot multivibrators and, thus, the pulse width as well as (via the amplifiers 31, 32) the amplitude of these pulses can be set via a control unit 35, being set independently of one another via lines 36 through 39. The magnetic coils 5 and 6 can thereby be supplied with an alternating field having a differing continuous amplitude. As a result thereof, it is possible to control the permanent magnet of FIG. 1 or 3 such that it oscillates around a desired position between the valves seats 9, 11. For example, this desired position can lie in the proximity of the valve seat 11, so that the gas flow is throttled through or by the valve 10. The gas flow through the valve arrangement 1 can be artibrarily continuously controlled on the basis of the described series means 23.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An electromagnetically actuated valve arrangement for flowing media including a sleeve in which an intake and a discharge valve each having a valve seat are mounted, a permanent magnet arranged axially displaceable being provided between said intake and said discharge valve, and the flow of the medium from said intake to said discharge valve being controllable via said permanent magnet, comprising the improvement wherein said permanent magnet includes continuations at both ends, said continuations proceeding in the moving direction of said permanent magnet and extending beyond or over said valve seats, said continuations being in the form of a tube in which said permanent magnet is secured.

2. A valve arrangement according to claim 1, wherein a common coil member is provided for magnetic coils which influence said permanent magnet, said sleeve forming said coil member.

3. A valve arrangement according to claim 2, wherein the radial spacing between said valve seats and said continuations as well as between said continuations and said sleeve are dimensioned such that said permanent magnet or said continuations thereof cannot come into contact with said sleeve.

4. A valve arrangement according to claim 1, wherein each valve seat contains elevations distributed over the circumference.

5. An electromagnetically actuated valve arrangement for flowing media including a sleeve in which an intake and a discharge valve each having a valve seat are mounted, a permanent magnet arranged axially displaceable being provided between said intake and said discharge valve, and the flow of the medium from said intake to said discharge valve being controllable via said permanent magnet, comprising the improvement wherein said permanent magnet includes continuations in its outer region and at both ends, said continuations proceeding in the moving direction of said permanent magnet and extending beyond or over said valve seats, each valve seat containing elevations distributed over the circumference which form a bead.

6. An electromagnetically actuated valve arrangement for a fluid comprising:
    an intake valve and a discharge valve, each having a valve seat;
    a sleeve member forming a common magnetic coil member in which said intake valve and said discharge valve are mounted, with their valve seats facing each other;
    a permanent magnet arranged axially displaceable within said sleeve member between said valve seats of said intake and discharge valves;
    said permanent magnet being mounted in a tube which extends beyond the ends of said magnet in the moving directions of said permanent magnet to extend beyond said valve seats;
    whereby the flow of fluid from said intake valve to said discharge valve is controllable by said permanent magnet.

7. An electromagnetically actuated valve arrangement according to claim 6, wherein the radial spacing between said valve seats and said tube as well as between said tube and said sleeve member is such that said permanent magnet or said tube cannot come into contact with said sleeve member.

8. An electromagnetically actuated valve arrangement for a fluid comprising:
    an intake valve and a discharge valve, each having a valve seat;
    a sleeve member forming a common magnetic coil member in which said intake valve and said discharge valve are mounted, with their valve seats facing each other;

a permanent magnet arranged axially displaceable within said sleeve member between said valve seats of said intake and discharge valves;

said permanent magnet being mounted in a tube which extends beyond the ends of said magnet in the moving directions of said permanent magnet to extend beyond said valve seats;

each valve seat including an annular bead around the circumference thereof, the diameter of said beads being smaller than that of said tube whereby the flow of fluid from said intake valve to said discharge valve is controllable by said permanent magnet.

* * * * *